UNITED STATES PATENT OFFICE.

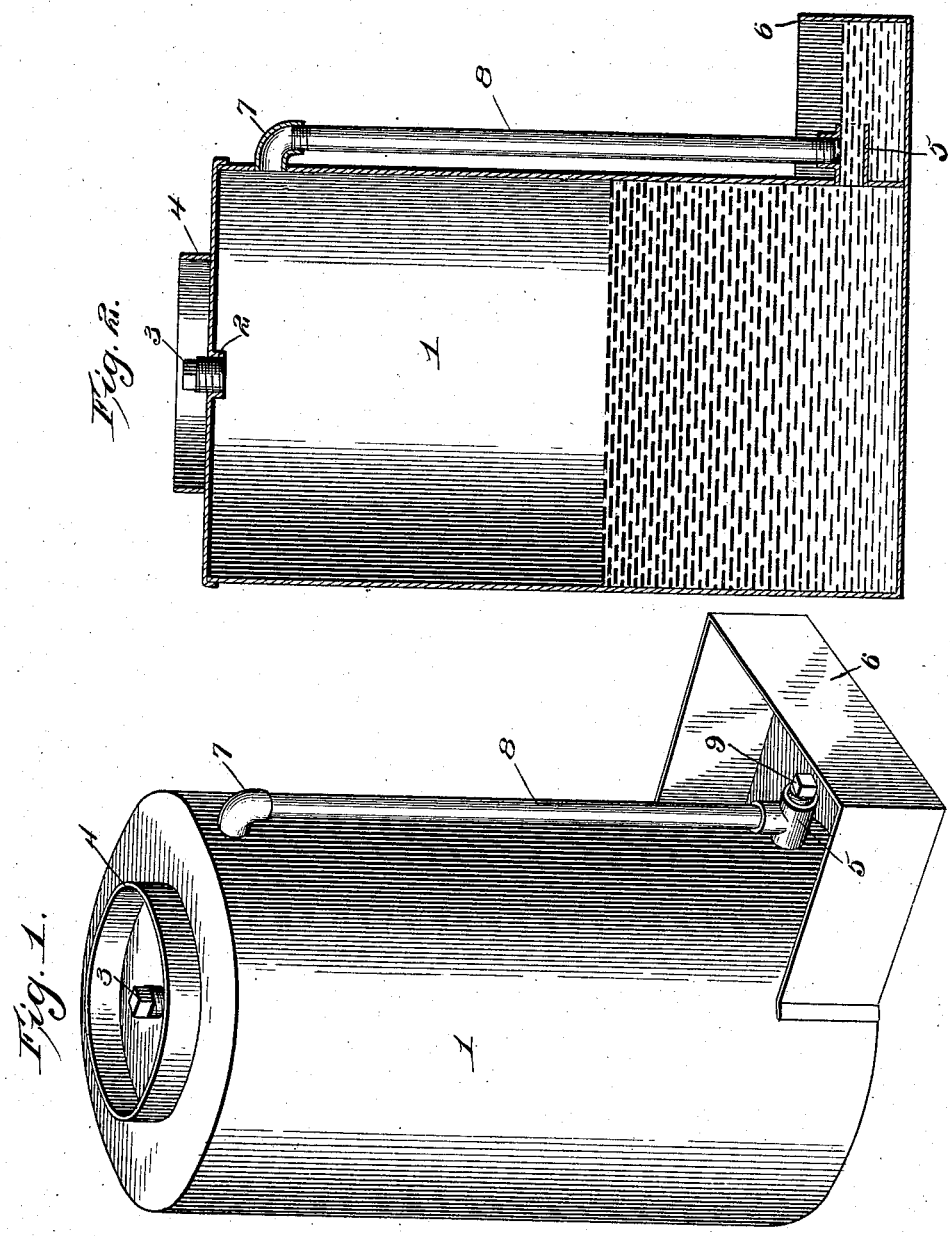

JOHN F. TANNEHILL, OF WALNUT GROVE, ILLINOIS.

DRINKING-FOUNTAIN.

No. 867,621.      Specification of Letters Patent.      Patented Oct. 8, 1907.

Application filed October 30, 1905. Serial No. 285,171.

To all whom it may concern:

Be it known that I, JOHN F. TANNEHILL, a citizen of the United States, residing at Walnut Grove, in the county of McDonough and State of Illinois, have invented certain new and useful Improvements in Drinking-Fountains; and I do hereby declare the following to be a full, clear, and exact description of the invention, such as will enable others skilled in the art to which it appertains to make and use the same.
My invention consists of drinking fountains for live stock and its object is to provide a simple, efficient device of this character having a trough adapted to be automatically supplied with water from a tank adjacent thereto, said tank and trough being provided with means whereby air may be very readily admitted to the tank without any opposition so that the level of the water in the trough can be raised.

The invention consists of the further novel features of construction and combination of parts, the preferred form whereof will be hereinafter made clearly apparent and pointed out in the claims, reference being had to the accompanying drawings which are made a part of this application and in which—

Figure 1 is a perspective view of my improved drinking fountain, and, Fig. 2 is a vertical section therethrough.

Referring to the figures by numerals of reference—1 is a tank which may be of any suitable size and contour and having an inlet 2 in the top thereof adapted to be closed by a screw-plug 3. A circular flange 4 surrounds the inlet and is for a purpose hereinafter more clearly set forth. A short outlet pipe 5 extends from the tank near its lower end and projects into a trough 6 which is disposed upon the side of the tank and the walls of which project above the pipe 5. An elbow 7 extends from the side of the tank near its upper end and this elbow is connected to the pipe 5 by means of a pipe 8 whereby a by-pass is formed to permit air to quickly enter the top of the tank 1 from the outlet pipe 5. A screw-plug 9 is adapted to be placed within the pipe 5 so as to close it when the tank is being filled or when, for any reason, it is desired to prevent water from entering the trough 6.

In using this fountain, the pipe 5 is first closed by means of plug 9 and plug 3 is removed. Water is then poured into the space inclosed by the flange 4 and will flow downward through the inlet 2 and into the tank. After a sufficient quantity of water has been placed in the tank, plug 3 is screwed into the opening 2 and plug 9 is removed. A portion of the water within the tank will be promptly forced by its own weight through the pipe 5 and into the trough and the water which is withdrawn in this manner will be promptly replaced by air entering the upper portion of the tank through the by-pass. As soon as the water in the trough reaches a level above the pipe 5 the admission of air to said pipe will of course be cut-off and therefore the remainder of the water within the tank will be held against displacement by atmospheric pressure. As the water is withdrawn from the trough, it will be replenished whenever the level of the water falls below the pipe 5 because the air will promptly reënter the pipe 5 and by-pass so as to cause a portion of the water within the tank to automatically flow into the trough.

I attach importance to the particular location of the pipe 8 because as soon as the water within the trough falls below a predetermined level, the air has a free, unobstructed passage from said trough to the top of the tank and has nothing whatever to retard it. I am aware that it has been customary to form vents in the sides of tanks for the discharge of water and the admission of air but such an arrangement has been found extremely undesirable because it has been found that the air rising in bubbles is considerably retarded by the water and therefore the replenishment of the water in the trough is not as rapid and effective as might be desired.

Having thus fully described my invention, what I claim as new and desire to secure by Letters Patent, is—

A drinking fountain comprising a tank having a normally closed inlet, a horizontally disposed outlet pipe extending from and at right angles to the tank and disposed above the lower end thereof, a trough into which said pipe projects near its mid-height, said trough being immovably connected with the tank, an air pipe extending from the upper portion of the tank to the outlet pipe and spaced a distance from the tank, said air pipe intersecting the bore in said outlet pipe adjacent its longitudinal center, the end of the air pipe being in the same horizontal plane as the upper surface of the outlet pipe, a flange upon the tank and surrounding the inlet and a detachable plug for closing the outlet pipe.

In testimony whereof I have signed my name to this specification in the presence of two subscribing witnesses.

JOHN F. TANNEHILL.

Witnesses:
JAS. V. VOORHEES,
J. T. McCANEL.